(12) United States Patent
Martin et al.

(10) Patent No.: US 7,139,648 B1
(45) Date of Patent: Nov. 21, 2006

(54) APPARATUS FOR ACTUATING A CONTROL ELEMENT FOR A HEATING OR AIR-CONDITIONING SYSTEM IN A MOTOR VEHICLE

(75) Inventors: Ralf Martin, Benningen (DE); Klaus Waibel, Kornwestheim (DE)

(73) Assignee: Behr GmbH & Co., Stuttgart (DE)

( * ) Notice: Subject to any disclaimer, the term of this patent is extended or adjusted under 35 U.S.C. 154(b) by 779 days.

(21) Appl. No.: 09/704,791

(22) Filed: Nov. 3, 2000

(30) Foreign Application Priority Data

Nov. 3, 1999 (DE) ............................... 199 52 898

(51) Int. Cl.
*G06F 7/00* (2006.01)
*G01M 17/00* (2006.01)
*H02J 13/00* (2006.01)

(52) U.S. Cl. .................... 701/36; 701/32; 307/36; 307/37; 307/38; 307/40; 340/825.52; 361/805

(58) Field of Classification Search ................ 701/36, 701/49, 32, 33; 710/100, 305, 104, 64, 9, 710/10; 340/825.52
See application file for complete search history.

(56) References Cited

U.S. PATENT DOCUMENTS

| 5,036,803 | A | * | 8/1991 | Nolting et al. ............. 123/41.1 |
| 5,508,689 | A | * | 4/1996 | Rado et al. ................. 307/10.1 |
| 5,615,344 | A | * | 3/1997 | Corder ......................... 710/62 |
| 5,698,992 | A | * | 12/1997 | El Ayat et al. ................ 326/41 |
| 5,835,020 | A |   | 11/1998 | Mizuta et al. .......... 340/825.06 |
| 5,841,360 | A | * | 11/1998 | Binder ................... 340/310.01 |
| 5,847,976 | A | * | 12/1998 | Lescourret ...................... 703/8 |
| 6,073,689 | A |   | 6/2000 | Mizuno ....................... 165/201 |
| 6,078,852 | A | * | 6/2000 | Milkner et al. ................ 701/36 |
| 6,131,125 | A | * | 10/2000 | Rostoker et al. ............. 709/250 |
| 6,225,769 | B1 | * | 5/2001 | Brenner et al. .............. 318/434 |
| 6,370,603 | B1 | * | 4/2002 | Silverman et al. ............ 710/72 |
| 6,618,788 | B1 | * | 9/2003 | Jacobs ......................... 710/315 |

FOREIGN PATENT DOCUMENTS

| DE | 44 17 602 | 11/1994 |
| DE | 195 32 280 | 3/1997 |
| DE | 197 08 383 | 6/1998 |
| DE | 198 08 152 | 9/1998 |

* cited by examiner

*Primary Examiner*—Thomas Black
*Assistant Examiner*—Brian J. Broadhead
(74) *Attorney, Agent, or Firm*—Foley & Lardner LLP

(57) ABSTRACT

The invention relates to an apparatus for actuating a control element, for example, an air flap, for a heating or air-conditioning system (34) in a motor vehicle, having an actuating drive (32), an electrical circuit (1) which controls the actuating drive (32), and a control section (36) for inputting control commands. The actuating drive (32), the circuit (1) and the control section (36) are connected to one another via at least one electrical cable (3). In order to provide an improved apparatus for actuating a control element, particularly with regard to reducing the production costs, the circuit (1) is arranged outside the actuating drive (32) and outside the control section (36) and, in particular, is preferably integrated in the databus (3). This allows identical actuating drives to be used cost-effectively for the different control elements.

12 Claims, 4 Drawing Sheets

APPARATUS FOR ACTUATING A CONTROL ELEMENT FOR A HEATING OR AIR-CONDITIONING SYSTEM IN A MOTOR VEHICLE

BACKGROUND OF THE INVENTION

The present invention relates to an apparatus for actuating a control element for a heating or air-conditioning system in a motor vehicle.

The introduction to the description of DE-OS 195 32 280 discloses the capability to use software to enter the identification codes or subscriber number of the various loads or electrical devices in order to address one of a number of devices, with the identification code being sent to the device via a connecting cable. Furthermore, it is stated in the introduction to the description that the individual devices can also be coded with the identification code via their connecting apparatus. Such a connecting apparatus is described in the exemplary embodiment in the cited document, in which the identification code is produced by interrupting specific conductor tracks.

SUMMARY OF THE INVENTION

One object of the present invention is to provide an improved apparatus for actuating a control element, particularly with regard to reducing the production costs.

In accomplishing the foregoing objects, there has been provided in accordance with one aspect of the present invention an apparatus for actuating a control element for a heating or air-conditioning system in a motor vehicle, comprising: an actuating drive; an electrical circuit operatively connected to the actuating drive; a control section for inputting control commands to the electrical circuit; and at least one electrical cable connecting together the actuating drive, the circuit and the control section, wherein the circuit is arranged remote from the actuating drive and from the control section.

In accordance with another aspect of the invention, there has been provided a method for installing an apparatus for actuating a control element for a heating or air-conditioning system in a motor vehicle, comprising: installing an actuating drive for a control element; installing a control section for inputting control commands to the control element; installing an electrical circuit operatively connected to the actuating drive but at a position remote from both the actuating drive and the control section, the electrical circuit including a memory for storing a subscriber number associated with the control element; connecting together the actuating drive, the circuit and the control section with at least one electrical cable comprising a databus; and storing in the memory a first subscriber number not later than in conjunction with the installation.

According to still another aspect of the invention, there has been provided a motor vehicle, comprising a heating or ventilating system including a plurality of control elements for the system and a plurality of corresponding actuating apparatus operatively associated with the control elements, wherein each actuating apparatus comprises an actuating apparatus according to the invention, and wherein at least a plurality of actuating drives in said system and, preferably, at least a plurality of electrical circuits are identical to one another and are interchangeable.

Further objects features, application options and advantages of the invention will be apparent from the following description of exemplary embodiments of the invention, which are illustrated in the figures of the drawing. In this case, all the described or illustrated features, intrinsically or in any desired combination, form the subject matter of the invention.

DETAILED DESCRIPTION OF THE PREFERRED EMBODIMENTS

Figure 1:
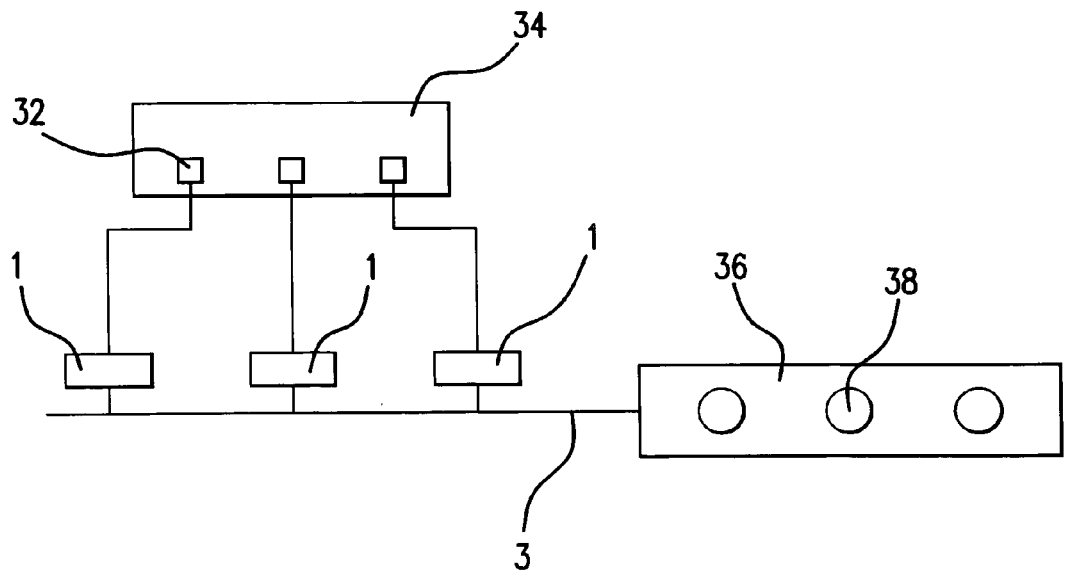
FIGS. 1 and 2 are schematic block diagrams illustrating exemplary embodiments of an apparatus according to the invention.

In the case of an apparatus according to the invention, the electrical and/or electronic circuit for controlling the actuating drive, (for example, a stepping motor) is arranged not only outside the actuating drive but also outside the control section into which the control commands can be entered. The "intelligence" of the actuating drive which, apart from possible addressing, includes all the data and program routines required to operate the specific function of the actuating drive, is moved away from the actual actuating drive and is preferably moved into the cable, that is to say into a cable run. The actuating drives for the various actuating functions for the heating and air-conditioning system, for example, adjustment of a mixing-air flap, adjustment of a defroster flap etc., can thus all be designed identically, so that only one type of actuating drive is used, irrespective of the location where the actuating drive is used. The logistics complexity is thus considerably reduced. Furthermore, only one type of actuating drive need be kept in stock for repairs, since the identical actuating drives within the heating or air-conditioning system are interchangeable, because the functions associated with them are in each case stored in the circuit which is integrated in the cable run and is associated with one actuating drive.

In order to save installation space and to improve handling during the installation process, the circuits are preferably integrated into the cable which connects the actuating drive to the control section.

The cable is preferably a databus, to which the individual actuating drives can be coupled. The circuit preferably has a programmable memory.

If, firstly, a memory which is coupled to the databus and is used for storing the subscriber number and, secondly, a component for setting the subscriber number are provided in the circuit, then, in contrast to the described prior art in which the circuit is provided either with software coding or with hardware coding, both addressing options are provided in the circuit. The user is thus free to allocate the subscriber number to the circuit as he wishes. At the same time, it is possible for the user to use software to enter the subscriber number in the memory via the databus, or to use hardware to set it on the module. Furthermore, as a third alternative, it is possible for the user to use both procedures, that is to say to code the circuit using software and hardware.

Intrinsically, greater complexity is required to provide both software and hardware subscriber number coding on the electrical circuit. The major advantage which results from this advantageous refinement is, however, that the creation of the circuit results in standardization. While two different circuits had to be produced for the prior art, namely a first circuit with software coding and a second circuit with hardware coding, all that is now necessary is to produce a single circuit. The apparatus according to the invention can be used by all users (e.g., auto manufacturers), irrespective of whether the respective user requires software or hardware coding.

This standardization results in a major cost advantage, among other areas in the administration and storage of the electrical circuit. Furthermore, the increased circuit quantities mean that the costs for the individual parts of the circuit, and also the costs for producing the circuit, can be considerably reduced. Any increased costs which may result from the additional components are considerably outweighed, overall, by the described cost advantages.

In one advantageous embodiment of the invention, the subscriber number which is stored in the memory can be overwritten by a new subscriber number, in which case the new subscriber number can be supplied to the memory either via the databus or via the component.

Thus, when the user has stored a subscriber number in the memory, it is possible for this stored subscriber number to be changed again later. In this case, the circuit is designed flexibly, in such a way that it is either possible to supply the new subscriber number to the memory via the databus, or in such a way that the new subscriber number can be entered, for example, by the user, via hardware on the component for setting the subscriber number.

Thus, once the subscriber number has been entered for the first time, it is possible for a user himself to preset a new subscriber number in a completely flexible manner. In this case, the new subscriber number can be allocated to the electrical circuit either by software or by hardware. The old subscriber number stored in the memory is then overwritten by the new subscriber number.

In another advantageous embodiment of the invention, a first subscriber number is stored in the memory during the production of the circuit. This means that the circuit is initialized by the manufacturer. The user can thus address the circuit via the databus using the stored first subscriber number. Then, as already explained, the user can enter a new subscriber number, which he requires, in the circuit.

It is particularly advantageous for the first subscriber number to be supplied via the databus. This means that the first subscriber number is stored in the memory via the databus during the production of the electrical circuit. This represents a particularly simple and thus cost-effective option for providing the circuit with the first subscriber number.

The memory preferably has an EEPROM. As is known, such an EEPROM is a memory module which can be written to and can be electrically erased again. Since such EEPROMs are mass-produced items, the costs for such a component are low.

The component for manually entering a subscriber number preferably has a number of switches for setting. It is thus possible to code the subscriber number of the respectively associated electrical circuit by setting the individual switches to appropriate switch positions.

In this case, the switches can, in particular, be operated manually. It is thus possible for the user to produce the subscriber number manually by means of an appropriate setting of the switches, and thus to allocate the subscriber number to the electrical circuit.

In one advantageous embodiment of the invention, two mutually associated connector parts are provided, by means of which the circuit can be connected to the databus, and by means of which the subscriber number can be set.

This results in the major advantage that the circuit is completely independent of the way in which the subscriber number is set. This subscriber number can then be set in various ways on the connector parts, without this having any influence on the circuit. The circuit can thus be produced in large numbers, identically.

It is particularly advantageous for the two connector parts each to have a number of connector contacts which can be connected to one of the conductors in the databus. The connection may in this case be produced using an insulation displacement technique.

In a further advantageous embodiment of the invention, the number of connector contacts in a plane and the number of planes are as equal as possible. This results in the advantage that the resultant connector part has an extremely compact physical form. The side edges of the connector part are of approximately the same length so that, in particular, there is no need for any flat, elongated connector parts with a large number of connector contacts in a single plane.

It is particularly advantageous in this case for two planes to be provided, in each of which three connector contacts are arranged. This results in one connector part for three bus lines, by means of which a maximum of 27 subscriber numbers can be coded.

Turning now to the drawings, an apparatus 30 according to the invention and illustrated schematically in FIG. 1 has at least one actuating drive 32, for example, a stepping motor, for operating a control element, for example, an air flap, for a heating or air-conditioning system 34 in a motor vehicle, an electrical and/or electronic circuit 1 which controls the actuating drive 32, and a control section 36 for entering control commands for controlling the heating or air-conditioning system 34. The actuating drive 32, the circuit 1 and the control section 36 are connected to one another via at least one electrical cable 3, which is preferably in the form of a databus, so that the control commands which are entered in the control section 36, for example, by means of rotary knobs 38, can be passed on via the circuits 1 to the actuating drives 32. Each actuating drive 32 in this case has an associated circuit 1. The circuit 1 contains all the data and functions required for operation of the respective actuating drive 32 and, if a number of actuating drives 32 are present, as is shown in FIGS. 1 and 2, it also contains the addressing, thus ensuring that the correct actuating drive 32 is always addressed by the control section 36.

Figure 2:
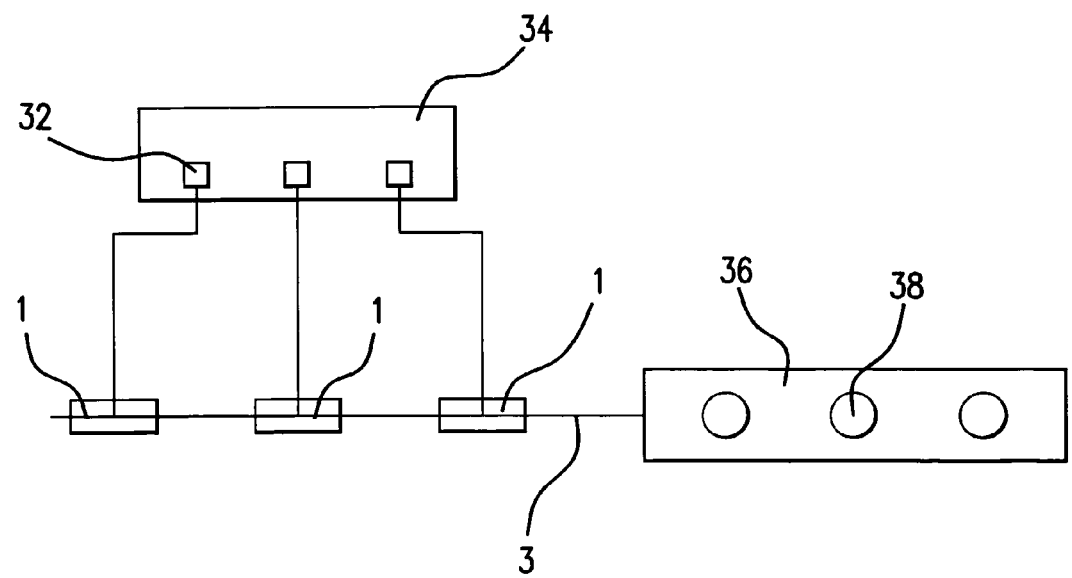

According to the invention, the circuit 1 is arranged outside the actuating drive 32 and outside the control section 36, and is preferably integrated into the data line 3, as is illustrated in FIG. 2. The circuits 1 can then be integrated in a cable run laid in the vehicle.

Figure 3:
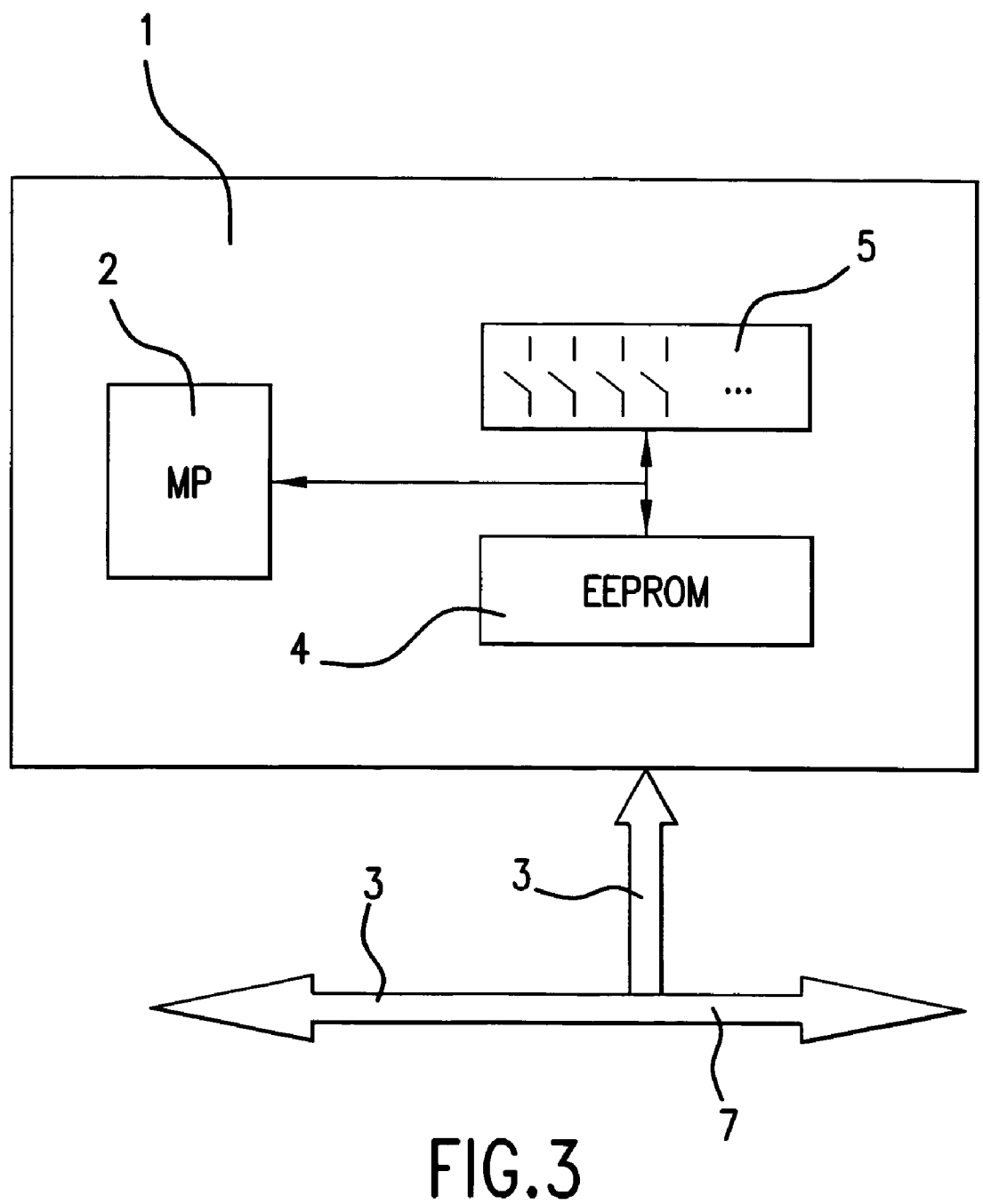
FIG. 3 is a schematic block diagram illustrating one exemplary embodiment of an electrical circuit according to the invention.

FIG. 3 illustrates such a circuit 1. The circuit 1 is provided with a microprocessor (MP) 2 which, among other reasons, is provided for carrying out control and/or regulation functions. A so-called ASIC (application specific integrated circuit) can also be provided, instead of the microprocessor 2. Furthermore, the circuit 1 is connected to the databus 3, via which the circuit 1 is supplied firstly with a supply voltage and secondly with the required data. The microprocessor 2 is supplied in particular, via the databus 3, with that information which is necessary in order to carry out the control and/or regulation functions to be carried out by the microprocessor 2.

For example, in a heating and/or ventilation system for a motor vehicle, it is necessary to use electric motors to actuate a number of flow flaps or the like. This means that there are a number of electrical circuits 1 in a motor vehicle. It is thus necessary to distinguish between the individual electrical circuits 1. This is done by allocating a so-called subscriber number to each of the circuits 1. After this, any information which is intended for a specific circuit 1 is coupled to the subscriber number and is then passed on via the databus 3 to all the circuits 1. That circuit 1 which has the subscriber number associated with the information reads the information from the databus 3, and then processes the information further. The identification of the associated information and the process of reading it into the circuit 1 are carried out, in particular, using the microprocessor 2.

One precondition for the described procedure in this case is that each of the electrical circuits 1 is allocated a specific, individual subscriber number. This subscriber number must then be present in the circuit 1 and, in particular, must be available for the microprocessor 2.

As is evident from FIG. 3, the circuit 1 has an electronically erasable programmable read only memory (a so-called EEPROM) 4. This memory 4 is intended for storing the subscriber number associated with the electrical circuit 1.

The memory 4 is coupled to the microprocessor 2 and to the databus 3. It is thus possible, among other things, for the microprocessor 2 to compare a subscriber number received from the databus 3 with the subscriber number stored in the memory 4. It is thus likewise possible for the microprocessor 2 to store a new subscriber number in the memory 4.

Furthermore, it is evident from FIG. 3 that a component 5 is provided for setting a subscriber number. The component 5 may comprise, for example, a number of switches, which can each be set to one of their two switch positions manually by a user. In this way, it is possible to use hardware to preset the subscriber number on the component 5. A number of plug connections or the like may likewise be provided as the component 5, by means of which reversible or irreversible electrical connections or interruptions can be produced.

The component 5 is connected at least to the microprocessor 2. It is thus possible for the microprocessor 2 to read a subscriber number set on the component 5. After this, the microprocessor 2 can store this subscriber number, for example, in the memory 4. It is likewise possible for the microprocessor to compare a subscriber number received from the databus 3 with the subscriber number set on the component 5.

By way of example, the production and operation of the electrical circuit can be envisaged as follows:

During the production of the electrical circuit 1, in particular during final assembly and/or testing of the circuit 1, a first subscriber number is stored in the memory 4 in the circuit 1. This first subscriber number is in this case supplied to the memory 4 via the databus 3. The storage process is carried out using the microprocessor 2. The electrical circuit 1 supplied to a user is thus allocated a specific, individual subscriber number from the start, and the user can use the subscriber number to address the circuit 1 via the databus 3.

If the user wishes to use software to reset the subscriber number, then this can be done by the new subscriber number being stored in the memory via the databus 3 and using the microprocessor 2. In the process, the old, first subscriber number is overwritten by the new subscriber number. After this, the user can address the circuit 1 via the databus 3, using the new subscriber number.

If the user wishes to use hardware to reset the subscriber number, then this can be done by the user using hardware to set the new subscriber number which he requires on the component 5. For example, the microprocessor 2 uses the changes carried out to the switches in the component 5 to identify the fact that the user has preset a new subscriber number on the component 5. The microprocessor 2 transfers the new subscriber number from the component 5, and stores the new subscriber number in the memory 4. In the process, the old, first subscriber number is overwritten by the new subscriber number. After this, the user can address the circuit 1 via the databus 3, using the subscriber number which he has newly preset on the component 5.

Such changes to the subscriber number can then be carried out during subsequent operation of the electrical circuit 1, as well.

Figure 4:
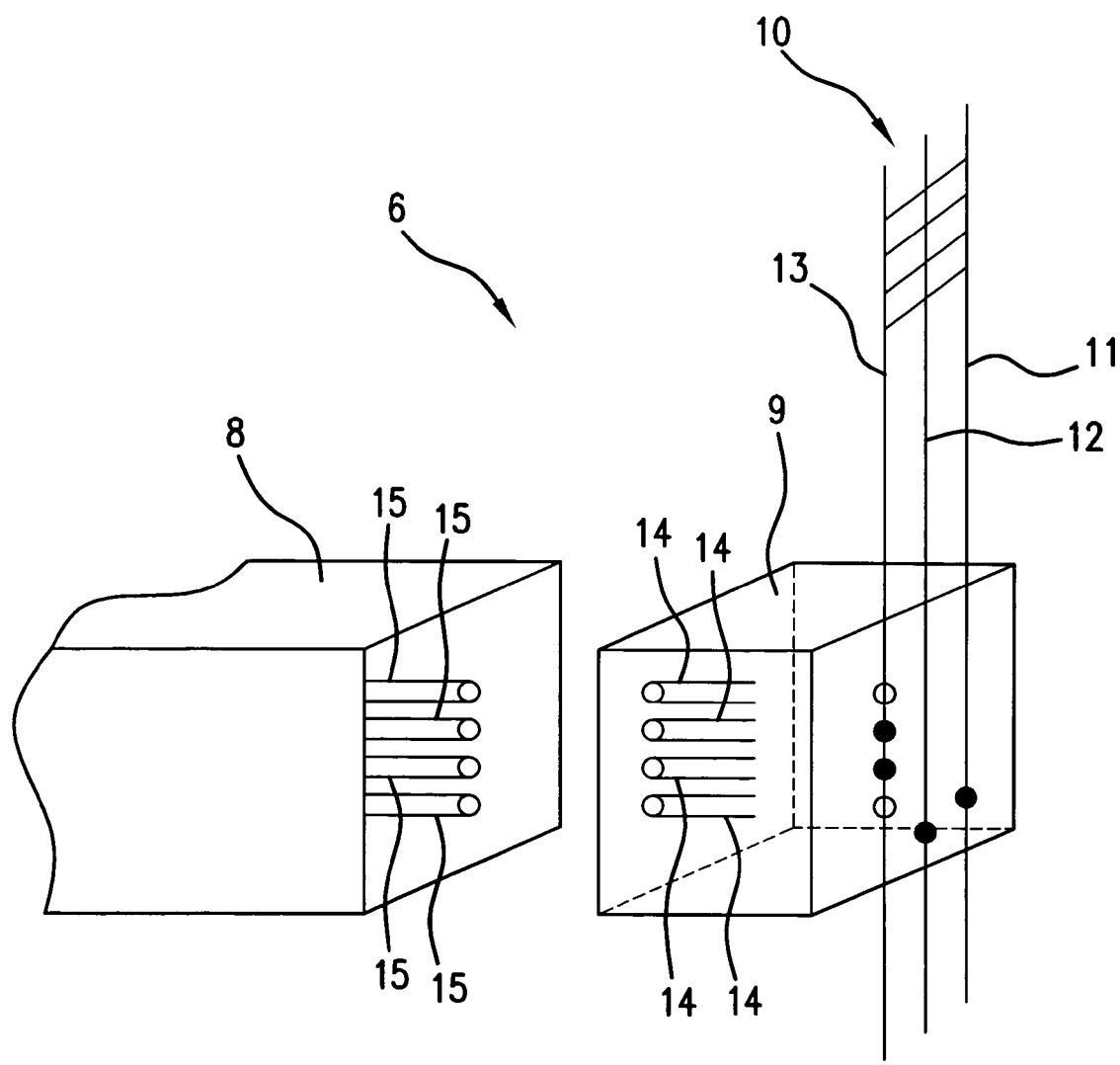
FIG. 4 is a schematic perspective illustration showing the hardware setting of a subscriber number for the circuit in FIG. 3.

FIG. 4 shows a component 6 which can be used instead of or in addition to the component 5. Like the component 5, which, by way of example, comprises a number of switches in FIG. 3, the component 6 illustrated in FIG. 4 is also used to allow the subscriber number to be set by hardware.

The component 6 is arranged at that junction point of the databus 3 at which branch lines branch off the bus lines to the electrical circuit 1. This junction point is denoted by the reference number 7 in FIG. 3.

As shown in FIG. 4, the component 6 has a first connector part 8 and a second connector part 9. The first connector part 8 is connected to the electrical circuit 1, and thus represents a portion of the branch lines. The second connector part 9 is connected to the bus lines. The bus lines are identified by the reference number 10 in FIG. 4 and have a positive and negative supply voltage conductor 11, 12, as well as a data line 13. The branch lines are not shown in FIG. 4.

The positive and negative supply voltage conductors 11, 12 are connected to the branch line, and thus to the electrical circuit 1, via mutually associated connector contacts (which are not shown) in the two connector parts 8, 9.

The data line 13 can be connected to four connector contacts 14 in the second connector part 9. This connection may be produced, for example, by means of an insulation displacement technique or the like. The data line 13 must be connected at least to one of the connector contacts 14. This results in a maximum of fifteen options for connecting the data lines 13 to the connector contacts 14.

The electrical circuit which is connected can be allocated a subscriber number by appropriate connection of the connector contacts 14 to the data line 13. By way of example, in FIG. 4, the two central connector contacts 14 are connected to the data line 13. With the individual connector contacts 14 having a successive binary value, this results in the subscriber number "6" in FIG. 4.

The first connector part 8 is provided with four connector contacts 15, which are associated with the connector contacts 14 in the second connector part 9. The four connector contacts 15 in the first connector part 8 are connected to the electrical circuit 1 via four conductors, which are not shown. The circuit 1 is thus connected to the positive and negative supply voltage conductors 11, 12, and is hence connected to the corresponding voltage supply. Furthermore, the circuit 1 is connected to the data line 13 via at least one of the connector contacts 14. The circuit 1 is connected to the data line 13 via a number of the connector contacts 14, corresponding to the subscriber number setting on the second connector part 9.

If there are now data signals on the data line 13, then these data signals are identified by the electrical circuit 1, in particular by the microprocessor 2, on those branch lines which are connected to the data line 13. Thus, in the example illustrated in FIG. 4, the data signals are identified on those branch lines which are connected to the two central connector contacts 14. The circuit 1 can derive its own subscriber number from this. Thus, in the present case, the circuit 1 identifies the fact that it has been allocated the subscriber number "6" by the second connector part 9.

This setting process can be carried out when the electrical circuit 1 is first connected to the databus 3 and/or at a later point in time. All that is required to do this is to connect the desired connector contact 14 to the data line 13.

Figure 5A:
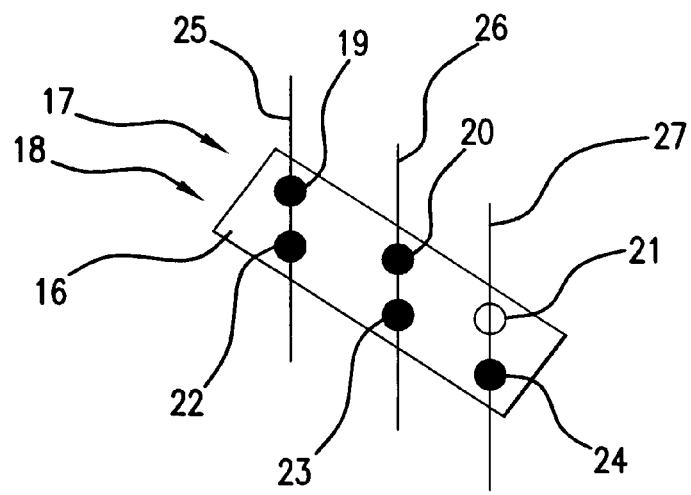
FIGS. 5*a* and 5*b* are schematic illustrations of a connector part for use in conjunction with FIG. 4.

FIG. 5a shows a connector part 16 which can be used instead of the connector part 8 or the connector part 9 in FIG. 4. The connector part 16 in FIG. 5a has two planes 17, 18, each having three connector contacts 19, 20, 21, 22, 23, 24. The number of connector contacts 19, 20, 21, 22, 23, 24 and the number of planes 17, 18 differs only by "1". This means that the connector part 16 has a compact external shape, with approximately equal side edges, i.e., more square or rectangular than flat.

In general, in the connector part 16 shown in FIG. 5a, the aim is for the number of connector contacts in a plane and the number of planes to be as equal as possible. The connector contacts 19, 20, 21 in the first plane 17 are arranged such that they are slightly offset with respect to the connector contacts 22, 23, 24 in the second plane 18. Two connector contacts 19, 22; 20, 23; 21, 24 which are arranged approximately one above the other are in each case associated with a common bus line. By way of example, the connector contacts 19, 22 can be connected to a positive supply voltage conductor 25, the connector contacts 20, 23 can be connected to a negative supply voltage conductor 26, and the connector contacts 21, 24 can be connected to a data line 27. In this case, each of the said bus lines 25, 26, 27 must be connected to at least one of the associated connector contacts 19, 22; 20, 23; 21, 24.

Figure 5B:
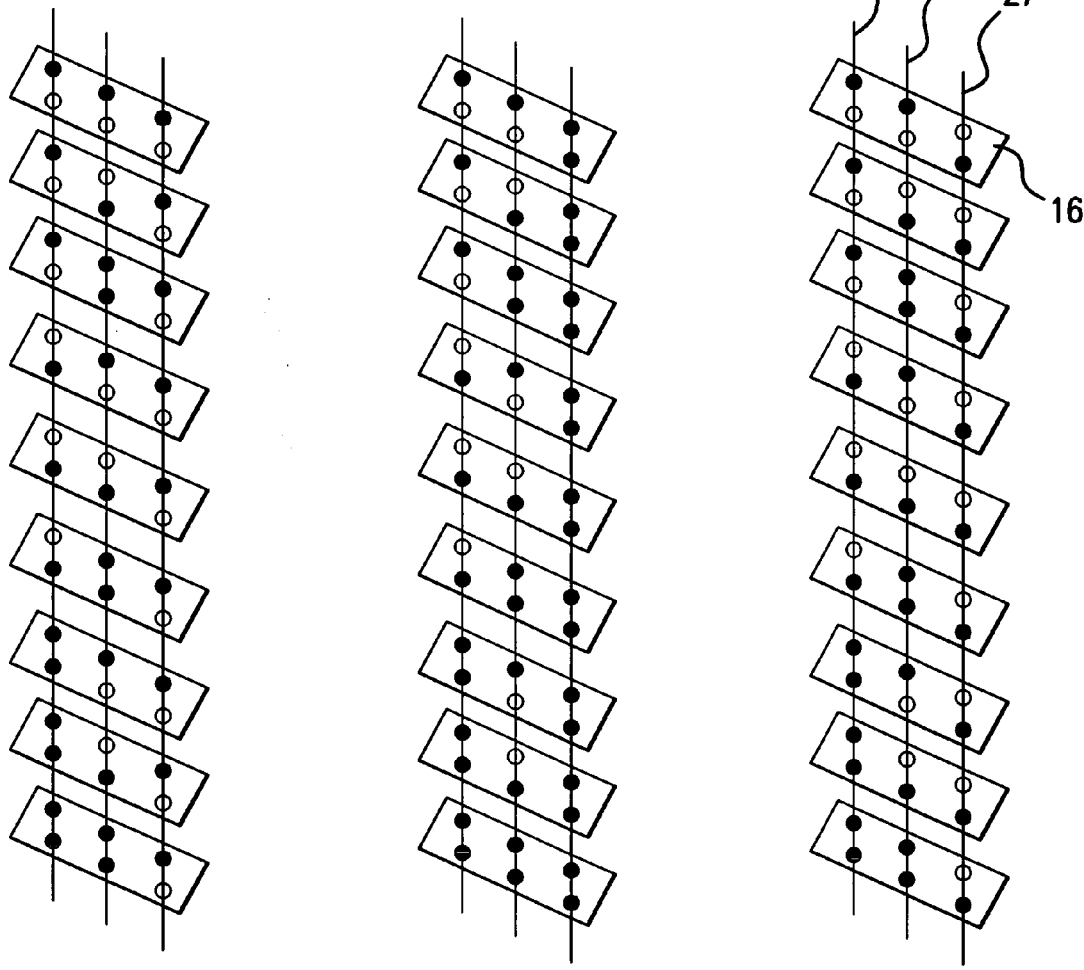

As is shown in FIG. 5b, there are a total of 27 options for how the three bus lines 25, 26, 27 can be connected to the associated connector contacts 19, 22; 20, 23; 21, 24.

If the circuit 1 is connected via the connector part 16 to the databus 3, and data are being transmitted on the databus 3, then, in particular, the microprocessor 2 in the electrical circuit 1 can use the signals arriving at the respective connector contacts 19, 20, 21, 22, 23, 24 to identify which connector contacts are connected to the associated bus lines. If, for example, no voltage is present on the line to the connector contact 20, but voltage is present at the connector contact 23, this means that the connector contact 20 is not connected to the negative supply voltage conductor 26, but only the connector contact 23. A corresponding situation applies to the connector contacts 19, 22; 21, 24, to the positive supply voltage conductor 25 and to the data line 27.

The connection of the connector contacts 19, 20, 21, 22, 23, 24 to the associated bus lines 25, 26, 27 represents the coding of the subscriber number for the associated electrical circuit 1. The 27 connection options thus make it possible to distinguish between 27 subscriber numbers. This subscriber number can be identified by the circuit 1, in the described way, during operation. The subscriber number can be changed at any time by changing the connections of the connector contacts 19, 20, 21, 22, 23, 24 to the bus lines 25, 26, 27. The circuit 1 then likewise identifies this immediately.

If, for one application, it is sufficient to be able to distinguish between nine subscriber numbers, then, for example, only a single connector contact can be allocated to the data line 27. In consequence, coding can be carried out only by means of two supply voltage conductors 25, 26 and the associated connector contacts 19, 20, 21, 22. In a corresponding modification of the figure, this results in a maximum of nine different options for different subscriber numbers.

It will be appreciated that many other embodiments are possible within the scope of the present invention, including further embodiments produced by making changes or modifications to the exemplary embodiments described above. It is intended that all possible embodiments of the invention be covered by the claims that follow.

The entire disclosure of German Patent Application No. 199 52 898.5, the priority document for the present application, is hereby incorporated by reference.

We claim:

1. An apparatus for actuating a control element for a heating or air-conditioning system in a motor vehicle, comprising:
   a first actuating drive;
   an electrical circuit operatively connected to the actuating drive wherein the electrical circuit comprises programmable memory suitable for overwritably storing a subscriber number and wherein the electrical circuit provides for both software and hardware coding of the subscriber number;
   a control section for inputting control commands to the electrical circuit;
   at least one electrical cable connecting together the actuating drive, the circuit and the control section, wherein the circuit is arranged remote from the actuating drive and from the control section and wherein the circuit is connected to the cable; and
   two mutually associated connector parts for connecting the circuit to the cable, wherein the subscriber number can be set by means of at least one of said connector parts via software coding by way of data provided from a data line connected to one of the connector parts.

2. An apparatus as claimed in claim 1, wherein the two connector parts each have a plurality of connector contacts that are selectively connectable to a conductor in the cable.

3. An apparatus as claimed in claim 2, wherein the connector contacts are located in plural planes, and the number of connector contacts located in a plane is not substantially the number of planes.

4. An apparatus as claimed in claim 3, wherein two planes are provided, in each of which three connector contacts are arranged.

5. An apparatus according to claim 2, wherein the plurality of connector contacts are connected to a single data line, in which a particular disposition of data bits in time sequence are respectively received by the plurality of connector contacts such that each one of the connector contacts retrieves a particular one of the data bits in accordance with the particular disposition, so as to receive a new subscriber number provided to the electrical circuit by way of software coding.

6. A motor vehicle, comprising a heating or ventilating system including a plurality of control elements for said heating or ventilating system and a plurality of corresponding actuating apparatus operatively associated with said control elements, wherein each actuating apparatus comprises an actuating apparatus as defined in claim 1, and wherein at least a plurality of actuating drives in said system and at least a plurality of electrical circuits in said system are identical to one another and are interchangeable.

7. A method for installing an apparatus for actuating a control element for a heating or air-conditioning system in a motor vehicle, comprising:
   installing an actuating drive for the control element;
   installing a control section for inputting control commands to the control element;
   installing an electrical circuit operatively connected to the actuating drive but at a position remote from both the actuating drive and the control section, wherein the electrical circuit comprises programmable memory suitable for overwritably storing a subscriber number associated with the control element, wherein the electrical circuit provides for both software and hardware coding of the subscriber number;
   connecting together the actuating drive, the circuit and the control section with at least one electrical cable comprising a databus and wherein the circuit is connected to the cable; and
   storing in the memory a first subscriber number not later than in conjunction with the installation,
   wherein the storing of the first subscriber number comprises providing a unique subscriber number by selectively making at least one connection between a plurality of contacts in a connector, respectively, to one of plural conductors contained in the databus.

8. An apparatus for actuating a control element for a heating or air-conditioning system in a motor vehicle, comprising:
   a first actuating drive;
   an electrical circuit operatively connected to the actuating drive wherein the electrical circuit includes a programmable memory which comprises an EEPROM and wherein the electrical circuit provides for both software and hardware coding of the subscriber number;
   a control section for inputting control commands to the electrical circuit;
   at least one electrical cable connecting together the actuating drive, the circuit and the control section, wherein the circuit is arranged remote from the actuating drive and from the control section and wherein the circuit is connected to the cable; and
   two mutually associated connector parts for connecting the circuit to the cable wherein each connector part comprises at least 2 planes, each plane comprising at least 3 connector contacts that are selectively connectable to a conductor in the cable.

9. An apparatus as claimed in claim 8, further comprising a flap for a motor vehicle heating or air-conditioning system wherein the flap is operatively linked to the actuating drive and wherein the flap comprises a mixing-air flap or a defroster flap.

10. An apparatus as claimed in claim 8, wherein the actuating drive comprises a stepping motor.

11. An apparatus as claimed in claim 8, wherein said at least one electrical cable comprises a positive supply voltage conductor, a negative supply voltage conductor and a data line.

12. An apparatus as claimed in claim 8, wherein the apparatus comprises at least one additional actuating drive which is substantially identical to the first actuating drive and which is operably linked to a flap for a motor vehicle heating or air-conditioning system.

* * * * *